(12) United States Patent
Broulim et al.

(10) Patent No.: US 6,909,585 B2
(45) Date of Patent: Jun. 21, 2005

(54) PROTECTION CIRCUIT PROTECTING AGAINST VOLTAGE IRREGULARITIES

(75) Inventors: Ludek Broulim, Oudenaarde (BE); Stefan Van Roeyen, Beveren (BE)

(73) Assignee: Ami Semiconductor Belgium BVBA, Oudenaarde (BE)

( * ) Notice: Subject to any disclaimer, the term of this patent is extended or adjusted under 35 U.S.C. 154(b) by 83 days.

(21) Appl. No.: 10/410,420

(22) Filed: Apr. 9, 2003

(65) Prior Publication Data

US 2003/0218844 A1 Nov. 27, 2003

(30) Foreign Application Priority Data

Apr. 22, 2002 (EP) .............................. 02291010

(51) Int. Cl.[7] .............................................. H02H 9/00
(52) U.S. Cl. ........................................ 361/58; 307/127
(58) Field of Search .......................... 361/93.9, 58, 77, 361/84, 92, 100, 101; 307/126, 127

(56) References Cited

U.S. PATENT DOCUMENTS

| | | | | |
|---|---|---|---|---|
| 4,138,664 A | * | 2/1979 | Conforti et al. | ............ 340/507 |
| 4,958,251 A | * | 9/1990 | Cini et al. | ..................... 361/84 |
| 4,992,683 A | * | 2/1991 | Robin, Jr. | ................... 327/432 |
| 5,517,379 A | | 5/1996 | Williams | ...................... 361/77 |
| 5,764,465 A | | 6/1998 | Mattes | ........................... 361/4 |

FOREIGN PATENT DOCUMENTS

| | | | | |
|---|---|---|---|---|
| DE | 10001485 A1 | 7/2001 | ............ | H02H/3/18 |
| EP | 041991 A2 | 4/1991 | ........... | H02H/11/00 |
| EP | 0629031 A2 | 12/1994 | ............ | H02H/3/18 |

OTHER PUBLICATIONS

Davis, "Overload and reverse—Current Circuitry protects battery and load", EDN, Mar. 1, 1996, vol. 41, No. 5, pp 165–168.

* cited by examiner

*Primary Examiner*—Ronald Leja
(74) *Attorney, Agent, or Firm*—Barnes & Thornburg

(57) ABSTRACT

Protection circuits (1) to be located between power supplies (2) and further circuitries (20,30) for protecting further circuitries (20,30) against voltage irregularities and comprising main transistors (7) coupled to switching circuits (10) for rendering main transistors (7) operative/non-operative can be made more allround by providing them with comparators (11) for controlling gate voltages of main transistors (7) via switches (12,13) to get protection against small negative voltage pulses and voltage fluctuations. Said switches (12,13) comprise two switches (12,13) for interrupting a reference voltage generated by a reference voltage source and for supplying a nearby ground voltage to said gate. A diode (14) between switch (13) and gate allows negative voltages at said gate for simplifying the introduction of further stages. Thick oxide transistors (15) protect further circuitries (20,30) and main transistors (7) against large negative voltage pulses. Capacitors (16) and resistors (17) coupled parallelly to thick oxide transistors (15) protect against large negative voltage pulses and reverse polarity. Serial transistors (21) are coupled anti-serially to main transistors (7) to get protection against large positive voltage pulses.

18 Claims, 1 Drawing Sheet

PROTECTION CIRCUIT PROTECTING AGAINST VOLTAGE IRREGULARITIES

The invention relates to a protection circuit to be located between a power supply and further circuitry for protecting said further circuitry against voltage irregularities and comprising an input to be coupled to said power supply and an output to be coupled to said further circuitry and a main transistor of which a first serial electrode is coupled to said input and of which a second serial electrode is coupled to said output and of which a control electrode is coupled to a switching circuit for rendering said main transistor operative/non-operative dependently upon an input voltage at said input.

A prior art protection circuit is known from U.S. Pat. No. 5,434,739 which discloses a pass transistor (main transistor) which is rendered operative when the power supply is properly connected. When the power supply is improperly connected (reverse polarity) a second transistor becomes active and the pass transistor is rendered inactive (non-operative) via a switching circuit comprising this second transistor.

The known protection circuit is disadvantageous, inter alia, due to just protecting the further circuitry like a load against reverse polarity and not protecting this further circuitry against other voltage irregularities (like large positive voltage pulses and/or large negative voltage pulses and/or voltage fluctuations).

It is an object of the invention, inter alia, of providing a protection circuit as defined in the preamble which in addition or alternatively protects the further circuitry against other voltage irregularities.

The protection circuit according to the invention is characterised in that the switching circuit comprises a comparator for comparing said input voltage at said input with a threshold voltage and for in dependence of comparison results controlling a control electrode voltage at said control electrode of said main transistor via at least one switch.

By providing said switching circuit with said comparator which in response to said input voltage being smaller than said threshold voltage controls said at least one switch such that said control electrode voltage at said control electrode of said main transistor is decreased, for example to about ground voltage, said main transistor is rendered non-operative. Via said at least one switch, a control electrode capacity of said main transistor can be discharged quickly, and as a result said main transistor is rendered non-operative quickly. As a result, the further circuitry for example comprising a load is now protected against small negative voltage pulses and voltage fluctuations like the decreasing of said normal power supply voltage (input voltage) below said threshold voltage.

The invention is based upon an insight, inter alia, that reverse polarity and large voltage pulses and voltage fluctuations are different kinds of voltage irregularities, and is based upon a basic idea, inter alia, that different kinds of voltage irregularities will require different measures: the two-stage protection (second transistor+pass transistor) described in said prior art US patent will then not be sufficient, and at least a three stage protection (comparator+ switch+main transistor) will need to be introduced.

The invention solves the problem, inter alia, of providing a protection circuit as defined in the preamble which, in addition or alternatively to protection against reverse polarity, protects further circuitry like loads against other voltage irregularities, and is advantageous, inter alia, in that a more allround protection is offered.

It should be noted that, in said prior art US patent, said second transistor could be regarded to be a kind of low complex comparator. However, this second transistor directly controls said pass transistor, and not indirectly via at least one switch. Further, said second transistor can only distinguish between two possibilities: correct polarity and reverse polarity, due to the threshold voltage in this prior art US patent being the ground voltage.

A first embodiment of the protection circuit according to the invention is advantageous in that said at least one switch comprises a first switch, conductive paths of which being coupled to a reference voltage source and to said control electrode of said main transistor, and comprises a second switch, conductive paths of which being coupled to ground and to said control electrode of said main transistor.

By providing said switching circuit with said first and second switch, with said comparator in response to said input voltage being smaller than said threshold voltage bringing the first switch in a nonconductive state and bringing the second switch in a conductive state, said main transistor is rendered non-operative due to a reference voltage generated by said reference voltage source (and being larger than said normal power supply voltage or input voltage) no longer being supplied to said control electrode of said main transistor, and due to a nearby ground voltage being supplied via said second switch.

A second embodiment of the protection circuit according to the invention is advantageous in that the switching circuit comprises a diode of which an anode is coupled to said control electrode of said main transistor and of which a cathode is coupled to said second switch.

By providing the switching circuit with said diode coupled anti-serial to a possible parasitic diode of said second switch, the control electrode of the main transistor can get a negative voltage. This simplifies the introduction of further stages.

A third embodiment of the protection circuit according to the invention is advantageous in that said comparator comprises a hysteresis function.

By providing the comparator with the hysteresis function, the protection circuit has a better stability.

A fourth embodiment of the protection circuit according to the invention is advantageous in that the switching circuit comprises a thick oxide transistor of which a first serial path electrode is coupled to said input and of which a second serial path electrode is coupled to said control electrode of said main transistor and of which a control electrode is coupled to a further reference voltage source.

By providing the switching circuit with said thick oxide transistor (like a field oxide transistor) which can handle (much) larger voltages than standard thin oxide transistors, said protection circuit can protect loads against large negative voltage pulses. In case of a large negative voltage pulse on the input, with said further reference voltage source for example generating a further reference voltage situated between ground voltage and the normal power supply voltage (input voltage), said thick oxide transistor becomes operative and thereby short-circuits the first serial path electrode and the control electrode of said main transistor. As a result, the main transistor is rendered non-operative, and the load is protected against large negative voltage pulses. Without said thick oxide transistor, said further circuitry (for example comprising said load) and said main transistor would not survive such a large negative voltage pulse.

A fifth embodiment of the protection circuit according to the invention is advantageous in that the switching circuit comprises a capacitor and a resistor coupled in parallel across said first serial path electrode and said control electrode of said main transistor.

By providing the switching circuit with said capacitor and said resistor coupled parallelly, the first serial path electrode and the control electrode of said main transistor are short-circuited at the moment of making a reverse polarity connection and afterwards. During absence of said reference voltage, said capacitor and resistor keep said main transistor non-operative. After some time, the thick oxide transistor will take over. So, the combination of the thick oxide transistor and the capacitor and resistor protects against large negative voltage pulses and reverse polarity.

The resistor could for example be realised via a transistor (MOST) having a connected gate and source. Such a resistor is advantageous in that it needs less surface than a conventional resistor on a chip. The non-linearity of such a resistor, which usually is disadvantageous, in this case will be further advantageous, due to said reference voltage source having a high internal impedance, which requires said resistor to be larger than a certain minimum value. Said non-linearity causes the value of this resistor to be smaller when it may be smaller and to be larger when it should be larger.

A sixth embodiment of the protection circuit according to the invention is advantageous in that the output of the protection circuit is coupled to an input of said further circuitry comprising a serial transistor of which one of the serial path electrodes is coupled to said second serial path electrode of said main transistor such that both serial path electrodes of both the main transistor and the serial transistor form an anti-serial path.

By coupling the protection circuit to the load via the serial transistor with both serial path electrodes of both the main transistor and the serial transistor forming an anti-serial path (the parasitic diodes of both said main transistor and said serial transistor are then coupled anti-serially such that, during reverse polarity or negative voltage pulses, at most a leakage current can flow through both parasitic diodes; such a leakage current is no threat to the load), the protection circuit also protects against large positive voltage pulses.

A seventh embodiment of the protection circuit according to the invention is advantageous in that said further circuitry comprises a voltage regulator comprising said serial transistor.

By providing the protection circuit with the voltage regulator comprising said serial transistor, the protection circuit even better protects against large positive voltage pulses under stabilizing circumstances thanks to the voltage regulator which itself is of common general knowledge and designed for stabilizng purposes.

It should further be noted that said thick oxide transistor on the one hand and said capacitor and said resistor coupled parallelly on the other hand could be used independently from each other and/or from said comparator. And of each embodiment comprising several parts each part could be combined with (a part of) another embodiment. The word "coupled" may correspond with a direct connection between two elements or with an indirect connection between two elements via a third element.

The invention further relates to an integrated circuit, like for example an ASIC like a mobile phone chip or an automotive chip etc., and to a device, like for example a mobile phone or an automotive device etc.

Both said integrated circuit and said device are wherein they comprise a protection circuit as defined before.

Embodiments of the integrated circuit section according to the invention and of the device according to the invention correspond with the embodiments of the protection circuit according to the invention. Said device may further comprise said power supply, and said integrated circuit and said device may further comprise said load.

These and other aspects of the invention will be apparent from and elucidated with reference to the embodiments(s) described hereinafter.

DETAILED DESCRIPTION

Figure 1:
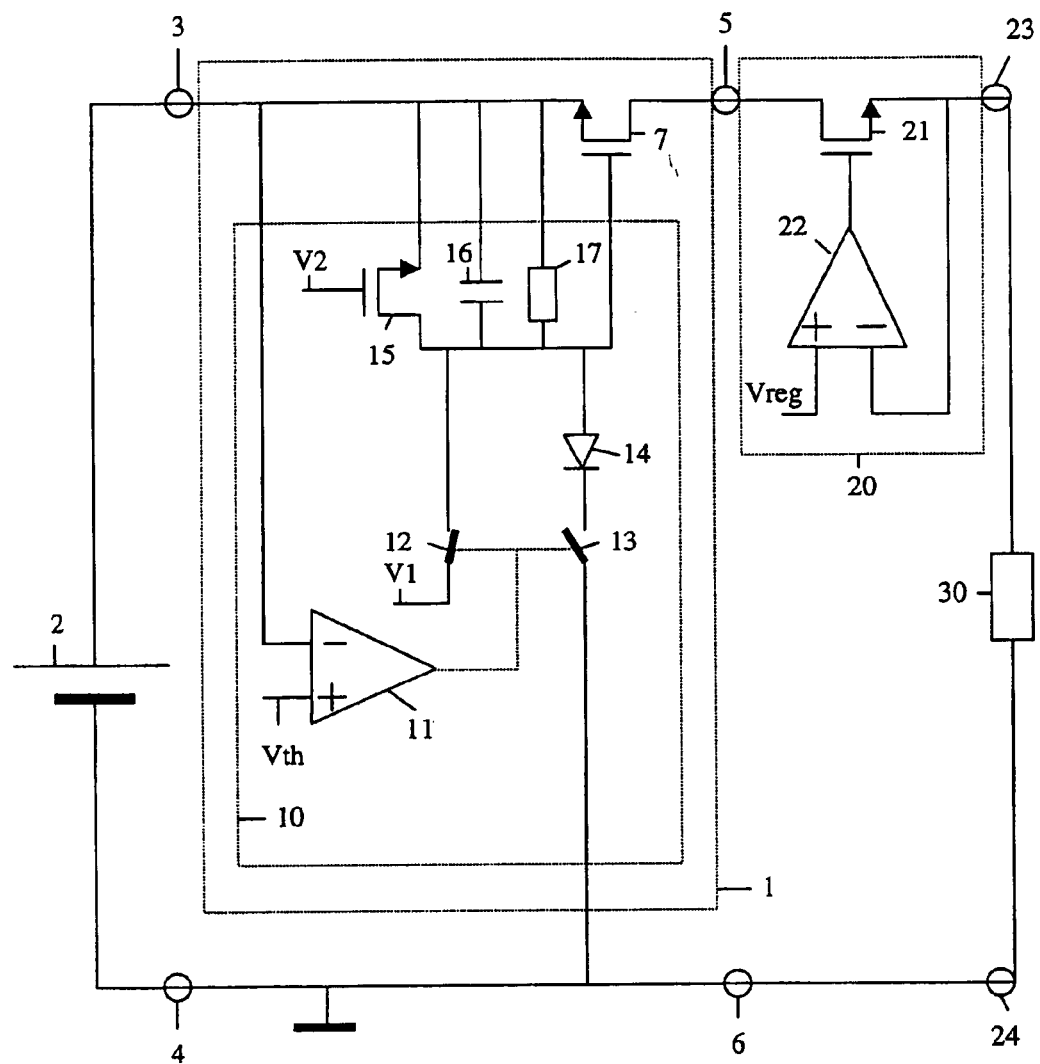
FIG. 1 illustrates in block diagram form a protection circuit according to the invention coupled to a power supply and to a voltage regulator.

The protection circuit 1 according to the invention is located between a power supply 2 and further circuitry 20,30 for protecting said further circuitry 20,30 against voltage irregularities and comprises an input 3,4 coupled to said power supply 2 and an output 5,6 coupled to said further circuitry 20,30 comprising for example a voltage regulator 20 and/or a load 30, with input 4 and output 6 being coupled to ground. Main transistor 7 has got a first serial electrode (or source for a MOS transistor) coupled to said input 3 and a second serial electrode (or drain for a MOS transistor) coupled to said output 5 and a control electrode (or gate for a MOS transistor) coupled to a switching circuit 10 for rendering said main transistor 7 operative/non-operative dependent upon an input voltage at said input 3,4. Switching circuit 10 comprises a comparator 11 for comparing said input voltage at said input 3,4 with a threshold voltage Vth (for details see below) and for in dependence of comparison results controlling a gate voltage at said gate of said main transistor 7 via controlling switches 12,13. Serial paths of first switch 12 are coupled to a reference voltage source V1 (for details see below) and to said gate of said main transistor 7 and serial paths of second switch 13 are coupled to ground and to said gate of said main transistor 7. Switching circuit 10 comprises a diode 14 of which an anode is coupled to said gate of said main transistor 7 and of which a cathode is coupled to said second switch 13. Said comparator 11 comprises a hysteresis function. Said comparator 11 and solid switches 12,13 may comprise thin oxide transistors. Switching circuit 10 further comprises a thick oxide transistor 15 being for instance a field oxide transistor of which a first serial path electrode or source is coupled to said input 3 and of which a second serial path electrode or drain is coupled to said gate of said main transistor 7 and of which a control electrode or gate is coupled to a further reference voltage source V2 (for details see below). Switching circuit 10 further comprises a capacitor 16 and a resistor 17 coupled in parallel across said field transistor 15.

The output 5 of the protection circuit 1 is coupled to an input of further circuitry 20,30 for example comprising a voltage regulator 20 which itself comprises a serial transistor 21 of which the drain is coupled to said drain of said main transistor 7 such that both serial path electrodes of both the main transistor 7 and the serial transistor 21 form an anti-serial path. As is well known in the field of voltage regulators, the source of serial transistor 21 forms an output 23 of said voltage regulator 20 and the gate is coupled to an output of an operational amplifier 22, of which an inverting input is coupled to the drain of serial transistor 21 and of which a non-inverting input is coupled to a regulating source. Outputs 23, 24 are coupled to load 30, with output 24 being coupled to ground.

The operation of protection circuit 1 is as follows. In case of power supply 2 being connected well (no reverse polarity), the normal power supply voltage (like for example 12 Volt in case of a battery) is present at input 3,4. Comparator 11 then compares slid normal input voltage with said threshold voltage Vth (like for example 8 Volt and situated below the normal power supply voltage or input voltage, for details see below) and in response controls switches 12 and 13 such that switch 12 is in a conducting state and switch 13 is in a non-conducting state. As a result, said reference voltage source V1 is coupled to the gate of main transistor 7, with a first reference voltage (like for example 24 Volt and being larger than said normal power supply voltage or input voltage, for details see below) generated by reference voltage source V1 being supplied to the gate of main transistor 7, and main transistor 7 is rendered operative, and a current flows from input 3 via transistor 7 and output 5 to the further circuitry 20,30, in this case consisting of serial transistor 21 coupled to load 30 via output 23.

Thick oxide transistor 15 at this moment is rendered non-operative since it is receiving a gate voltage from further reference voltage source V2 generating a second reference voltage (like for example 4 Volt and situated between ground voltage and the normal power supply voltage or input voltage, for details see below), which lies below said first reference voltage present at its drain.

In case of a negative voltage pulse (of for example minus 6 Volt) or a voltage fluctuation (of for example minus 6 Volt) at input 3,4, the input voltage at input 3,4 drops below said threshold voltage Vth, and comparator 11 quickly reacts by controlling switches 12 and 13 such that switch 12 is brought into a non-conducting state and switch 13 is brought into a conducting state. As a result, said reference voltage source V1 is no longer coupled to the gate of main transistor 7, and the gate voltage at the gate of main transistor 7 can no longer exceed the conducting voltage of diode 14 (like for example 0.7 Volt), and main transistor 7 is rendered non-operative: said current can no longer flow, and said further circuitry 20,30 (comprising for example said load 30 and/or said voltage regulator 20) is protected against said negative voltage pulse or said voltage fluctuation.

Thick oxide transistor 15 at this moment is rendered non-operative due to receiving a gate voltage from further reference voltage source V2 (like for example 4 Volt already mentioned), which lies below said normal power supply voltage present at its source.

In case of a negative voltage pulse growing larger (of for example minus 10 Volt) or a voltage fluctuation growing larger (of for example minus 10 Volt) at input 3,4, the input voltage at input 3,4 drops further below said threshold voltage Vth, and comparator 11 keeps switches 12 and 13 as they are. But due to thick oxide transistor 15 now having a second reference voltage at its gate larger than said input voltage at its source, thick oxide transistor 15 is rendered into an operative state. As a result, the voltage present at the source-gate-path of main transistor 7 will be nearby 0 Volt: now not just the further circuitry 20,30 is protected against negative voltage pulses and voltage fluctuations, but also main transistor 7 is protected, the latter being important since it consists of a thin oxide transistor. As is well known, thick oxide transistors can handle large voltages without being damaged.

In case of a negative voltage pulse growing extremely larger (of for example minus 50 Volt) or a voltage fluctuation growing extremely larger (of for example minus 50 Volt) at input 3,4, the input voltage at input 3,4 drops further below said threshold voltage Vth, and comparator 11 keeps switches 12 and 13 as they are. Thick oxide transistor 15 stays in an operative state, resulting in its source-drain voltage being nearly zero. So, even in case of extremely large negative voltage pulses or extremely large voltage fluctuations, the voltage at the source of main transistor 7 will be about the some as the voltage at the gate of this main transistor 7, which will then not be damaged. Diode 14, due to switch 13 still being in a conducting state, allows both said voltages to be equal.

Said reference voltage source V1 and further reference voltage source V2 are so-called internal sources: usually they supply stabilised voltages which do not follow pulses and fluctuations and which are there as long as a power supply is connected properly. In case of said power supply being connected improperly (reverse polarity), both voltages will no longer be supplied, although certain internal impedances to ground will be present. Said threshold voltage is derived from a so-called external source, like for example power supply 2, and is for example directly derived from this power supply 2 in a way known to a person skilled in the art.

Comparator 11 comprises a hysteresis function, to improve stability. Such a hysteresis function for example changes the turning point of the comparator: after voltage A has become larger than voltage B, the comparator's output goes from logic zero to logic one, but then the comparator's output goes back from logic one to logic zero not when voltage A has become smaller than voltage B, but for example when voltage A has become smaller than voltage B minus one Volt, to prevent vibrations etc.

In case of connecting power supply 2 improperly (reverse polarity), both reference voltage sources will not generate their voltages but will just show their internal impedances, and the position of both switches 12,13 is undefined. Said capacitor 16 and said resistor 17 coupled parallelly to the source-gate-path of main transistor 7 will, in response to this reverse polarity, short-circuit this source-gate-path, and as a result main transistor 7 is rendered non-operative, and further circuitry 20,30 is protected against reverse polarity. After some time, the thick oxide transistor 15 will take over this short-circuiting, due to thick oxide transistor 15 being rendered operative, as a result of its gate receiving about ground voltage and its source receiving the reverse polarity power supply voltage (like for example minus 12 Volt). So, the combination of the thick oxide transistor 15 and the capacitor 16 and resistor 17 protects against large negative voltage pulses and reverse polarity.

Switches 12,13 and comparator 11 for example comprise thin oxide transistors. Diode 14 is then coupled anti-serial to a parasitic diode of switch 13, which parasitic diode will have an anode coupled to ground and a cathode coupled to the cathode of diode 14. Then at most the leakage current of one of them can flow through the other.

For the further circuitry 20,30 consisting of a voltage regulator 20, this comprises a serial transistor 21 of which the drain is coupled to the drain of main transistor 7. Then both transistors 7,21 form an anti-serial path, and the parasitic diodes of both said main transistor and said serial transistor are then coupled anti-serially: the parasitic diode of main transistor 7 has an anode coupled to its source and a cathode coupled to its drain, and the parasitic diode of serial transistor 21 has an anode coupled to its source and a cathode coupled to its drain. Then at most the leakage current of one of them can flow through the other. During reverse polarity or negative voltage pulses, at most this leakage current can flow through both parasitic diodes; such a leakage current is no threat to the load. As a result, protection against large positive voltage pulses is now also provided thanks to the serial transistor, and under stabilizing circumstances, thanks to the voltage regulator, which itself is of common general knowledge and designed for stabilizing purposes.

The invention is based upon an insight, inter alia, that reverse polarity and large voltage pulses and voltage fluctuations are different kinds of voltage irregularities, and is based upon a basic idea, inter alia, that different kinds of voltage irregularities will require different measures: the two-stage protection (second transistor+pass transistor) described in said prior art US patent will then not be sufficient, and at least a three stage protection (comparator+switch+main transistor) will need to be introduced, with preferably a four stage protection (comparator+switch+main transistor+thick oxide transistor) or a five stage protection (comparator+switch+main transistor+thick oxide transistor+capacitor/resistor). But other three or more stage protections are not to be excluded (like for example switching circuit+main transistor+thick oxide transistor or switching circuit+main transistor+capacitor/resistor etc.).

Until now, embodiments were described whereby all transistors were MOS-type transistors. However implementations using bipolar transistors are as well possible. As is well known, when replacing an MOS transistor with a bipolar transistor, an emitter is replacing the source, a collector is replacing the drain and a base is replacing the gate of the MOS transistor.

By providing/realising said main transistor and said comparator and said at least one switch with/through thin oxide transistors as in CMOS, the protection circuit has however the advantage of being well integratable and cheaper compared to the prior art US patent which was using thin oxide transistors and bipolar transistors in the same circuit. The protection circuit based upon thin oxide transistors circuit and a thick oxide transistor is very advantageous since in CMOS, thin oxide process steps are standard, and do not require additional process steps for creating a thick oxide (by for example using the field oxide), where bipolar transistors in combination with CMOS would require additional different process steps which results in a more expensive product.

While the principles of the invention have been described above in connection with specific apparatus, it is to be clearly understood that this description is node only by way of example and not as a limitation on the scope of the invention, as defined in the appended claims.

What is claimed is:

1. Protection circuit (1) to be located between a power supply (2) and further circuitry (20,30) for protecting said further circuitry (20,30) against voltage irregularities and comprising on input (3,4) to be coupled to said power supply (2) and an output (5,6) to be coupled to said further circuitry (20,30) and a main transistor (7) of which a first serial electrode is coupled to said input (3) and of which a second serial electrode is coupled to said output (5) and of which a control electrode is coupled to a switching circuit (10) for rendering said main transistor (7) operative/non-operative dependently upon an input voltage at said input (3,4), wherein the switching circuit (10) comprises a comparator (11) for comparing said input voltage at said input (3,4) with a threshold voltage (Vth) and for in dependence of comparison results controlling a control electrode voltage at said control electrode of said main transistor (7) by using at least one switch (12,13) to couple the control electrode to ground, or couple the control electrode to a higher reference voltage source, to switch the main transistor off or on.

2. Protection circuit (1) according to claim 1, characterised in that said at least one switch (12,13) comprises a first switch (12), conductive paths of which being coupled to a reference voltage source (V1) and to said control electrode of said main transistor (7), and comprises a second switch (13), conductive paths of which being coupled to ground and to said control electrode of said main transistor (7).

3. Protection circuit (1) according to claim 2, characterised in that the switching circuit (10) comprises a diode (14) of which an anode is coupled to said control electrode of said main transistor (7) and of which a cathode is coupled to said second switch (13).

4. Protection circuit (1) according to claim 1, wherein said comparator (11) comprises a hysteresis function.

5. Protection circuit (1) according to claim 1, wherein the switching circuit (10) comprises a thick oxide transistor (15) of which a first serial path electrode is coupled to said input (3) and of which a second serial path electrode is coupled to said control electrode of said main transistor (7) and of which a control electrode is coupled to a further reference voltage source (V2).

6. Protection circuit (1) according to claim 5, wherein the switching circuit (10) comprises a capacitor (16) and a resistor (17) coupled in parallel across said first serial path electrode and said control electrode of said main transistor (7).

7. Protection circuit (1) according to claim 5, wherein the output (5) of the protection circuit (1) is coupled to an input of said further circuitry (20,30) comprising a serial transistor (21) of which one of the serial path electrodes is coupled to said second serial path electrode of said main transistor (7) such that both serial path electrodes of both the main transistor (7) and the serial transistor (21) form an anti-serial path.

8. Protection circuit (1) according to claim 7, wherein said further circuitry (20,30) comprises a voltage regulator (20) comprising said serial transistor (21).

9. Integrated circuit, wherein the integrated circuit comprises a protection circuit (1) according to claim 1.

10. Device, wherein the device comprises a protection circuit (1) according to claim 1.

11. Protection circuit (1) to be located between a power supply (2) and further circuitry (20,30) for protecting said further circuitry (20,30) against voltage irregularities and comprising an input (3,4) to be coupled to said power supply (2) and an output (5,6) to be coupled to said further circuitry (20,30) and a main transistor (7) of which a first serial electrode is coupled to said input (3) and of which a second serial electrode is coupled to said output (5) and of which a control electrode is coupled to a switching circuit (10) for rendering said main transistor (7) operative/non-operative dependently upon an input voltage at said input (3,4), wherein the switching circuit (10) comprises a comparator (11) for comparing said input voltage at said input (3,4) with a threshold voltage (Vth) and for in dependence of comparison results controlling a control electrode voltage at said control electrode of said main transistor (7) via at least one switch (12,13) said at least one switch (12,13) comprising a first switch (12), conductive paths of which are coupled to a reference voltage source (V1) and to said control electrode of said main transistor (7), and a second switch (13), conductive paths of which are coupled to ground and to said control electrode of said main transistor (7), the switching circuit (10) comprising a diode (14) of which an anode is coupled to said control electrode of said main transistor (7) and of which a cathode is coupled to said second switch (13).

12. Protection circuit (1) according to claim 11, wherein said comparator (11) comprises a hysteresis function.

13. Protection circuit (1) according to claim 11, wherein the switching circuit (10) comprises a thick oxide transistor (15) of which a first serial path electrode is coupled to said input (3) and of which a second serial path electrode is coupled to said control electrode of said main transistor (7) and of which a control electrode is coupled to a further reference voltage source (V2).

14. Protection circuit (1) according to claim 13, wherein the switching circuit (10) comprises a capacitor (16) and a resistor (17) coupled in parallel across said first serial path electrode and said control electrode of said main transistor (7).

15. Protection circuit (1) according to claim 13, wherein the output (5) of the protection circuit (1) is coupled to an input of said further circuitry (20,30) comprising a serial transistor (21) of which one of the serial path electrodes is coupled to said second serial path electrode of said main transistor (7) such that both serial path electrodes of both the main transistor (7) and the serial transistor (21) form an anti-serial path.

16. Protection circuit (1) according to claim 15, wherein said further circuitry (20,30) comprises a voltage regulator (20) comprising said serial transistor (21).

17. Integrated circuit, wherein the integrated circuit comprises a protection circuit (1) according to claim 11.

18. Device, wherein the device comprises a protection circuit (1) according to claim 11.

* * * * *